United States Patent
Ellis et al.

(10) Patent No.: US 8,792,273 B2
(45) Date of Patent: Jul. 29, 2014

(54) DATA STORAGE SYSTEM WITH POWER CYCLE MANAGEMENT AND METHOD OF OPERATION THEREOF

(75) Inventors: Robert W. Ellis, Phoenix, AZ (US); Scott Creasman, Gilbert, AZ (US)

(73) Assignee: Smart Storage Systems, Inc., Milpitas, CA (US)

( * ) Notice: Subject to any disclaimer, the term of this patent is extended or adjusted under 35 U.S.C. 154(b) by 142 days.

(21) Appl. No.: 13/493,912

(22) Filed: Jun. 11, 2012

(65) Prior Publication Data

US 2012/0317433 A1  Dec. 13, 2012

Related U.S. Application Data

(60) Provisional application No. 61/496,243, filed on Jun. 13, 2011.

(51) Int. Cl.
*G11C 11/34* (2006.01)

(52) U.S. Cl.
USPC ............ 365/185.03; 365/185.11; 365/185.17; 365/185.29; 365/185.33

(58) Field of Classification Search
USPC ............ 365/185.03, 185.11, 185.17, 185.29, 365/185.33, 226, 228
See application file for complete search history.

(56) References Cited

U.S. PATENT DOCUMENTS

| | | | |
|---|---|---|---|
| 8,127,202 B2 | 2/2012 | Cornwell et al. | |
| 8,289,801 B2 * | 10/2012 | Smith et al. | 365/228 |
| 2009/0327591 A1 | 12/2009 | Moshayedi | |
| 2010/0050053 A1 | 2/2010 | Wilson et al. | |
| 2010/0332726 A1 | 12/2010 | Wang | |

* cited by examiner

*Primary Examiner* — Trong Phan
(74) *Attorney, Agent, or Firm* — Morgan, Lewis & Bockius LLP

(57) ABSTRACT

A method of operation of a data storage system includes: providing a power monitor module for detecting a loss of host power; interrupting a unit controller by the power monitor module; configuring a memory controller by the unit controller; and writing a non-volatile memory array for storing in-flight data and contents of a system control random access memory in a multi-level cell NAND flash device in response to detecting the loss of the host power.

20 Claims, 4 Drawing Sheets

DATA STORAGE SYSTEM WITH POWER CYCLE MANAGEMENT AND METHOD OF OPERATION THEREOF

CROSS-REFERENCE TO RELATED APPLICATION

This application claims the benefit of U.S. Provisional Patent Application Ser. No. 61/496,243 filed Jun. 13, 2011, and the subject matter thereof is incorporated herein by reference thereto.

TECHNICAL FIELD

The present invention relates generally to a data storage system, and more particularly to a system for maintaining data integrity of a data storage system, using non-volatile media, during power transitions.

BACKGROUND ART

Reliable data storage requires the completion of storage operations after an initial power outage. The power outage may be the result of a system failure or an ordered power down process. A transition time between initial power outage and complete loss of energy can provide an opportunity to perform last minute data storage functions in order to assure the data is written to the non-volatile media.

Capacitors provide a reliable method for storing energy within an electronic system such that, during a power-failure event, the capacitors can be discharged to provide power to the device until an orderly shutdown can be effected. The period of discharge is referred to as "hold-up time."

Typically, hold-up capacitors store energy used by switch-mode power supplies or other power regulators that deliver the power used by the system. These power regulators have a minimum voltage at which they can operate, typically on the order of 2.5 to 3.0 volts, so when the capacitor storage bank discharges below this minimum voltage, the regulators must turn off and the device cannot continue to operate.

Thus, a need still remains for a data storage system, using non-volatile media, which maintains data integrity during power transitions. In view of the expansion of mission critical data and the confidential personal information, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a data storage system including: providing a power monitor module for detecting a loss of host power; interrupting a unit controller by the power monitor module; configuring a memory controller by the unit controller; and writing a non-volatile memory array for storing in-flight data and contents of a system control random access memory in a multi-level cell NAND flash device in response to detecting the loss of the host power.

The present invention provides a data storage system, including: a power monitor module for detecting a loss of a host power; a unit controller coupled to the power monitor module for responding to the loss of the host power detected; a memory controller coupled to the unit controller; and a non-volatile memory array coupled to the memory controller for storing the in-flight data and contents of a system control random access memory includes writing only fast pages of a multi-level cell NAND flash device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
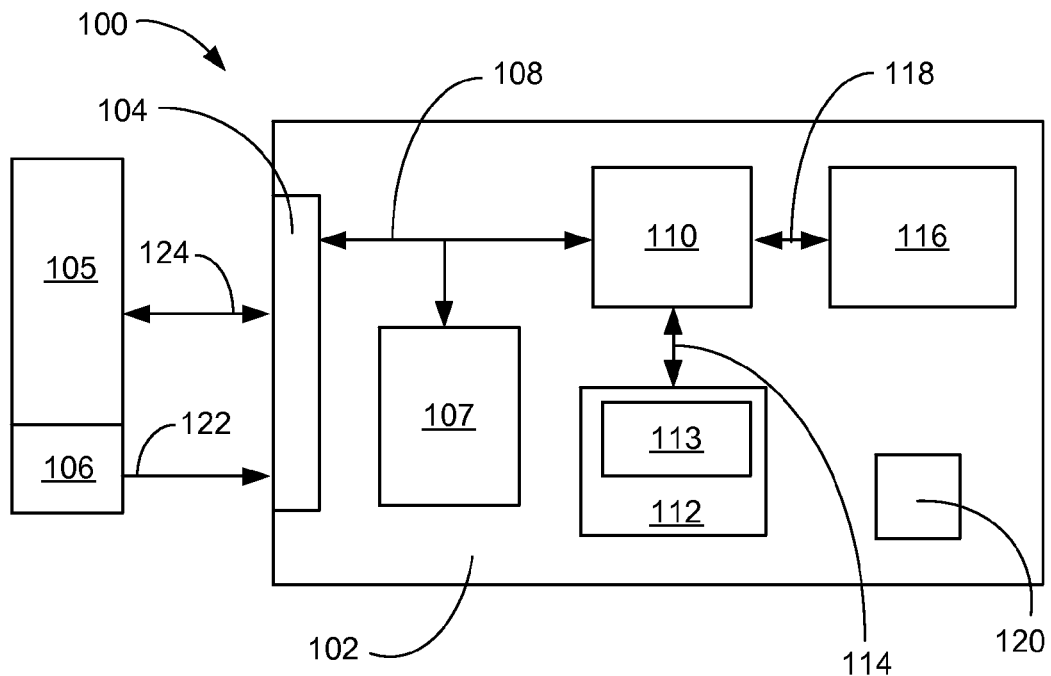
FIG. 1 is a block diagram of a data storage system with power cycle management in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation.

The same numbers are used in all the drawing FIGS. to relate to the same elements. The embodiments have been numbered first embodiment, second embodiment, etc. as a matter of descriptive convenience and are not intended to have any other significance or provide limitations for the present invention.

Referring now to FIG. 1, therein is shown a block diagram of a data storage system 100 with power cycle management in an embodiment of the present invention. The block diagram of the data storage system 100 depicts a system board 102, such as a printed circuit board for mounting and interconnecting the components of the data storage system 100.

A storage system interface 104 can be used to couple the data storage system 100 to a host interface 105 including a host power interface 106. The storage system interface 104 can support protocol management and communication with the next level system. The storage system interface 104 can be a parallel advanced technology attachment (PATA), a serial advanced technology attachment (SATA), serial attached small computer system interface (SAS), personal computer interface express (PCI-E), or the like.

A unit controller 107 is coupled to the storage system interface 104 through a storage bus 108. The unit controller 107 can include a processor, interface logic, local storage, embedded memory, or a combination thereof. The unit controller 107 can communicate with the storage system interface 104 for supporting protocol management, exception handling, initialization, configuration management, or a combination thereof.

The unit controller 107 can also be coupled to a memory controller 110 through the storage bus 108. The memory controller 110 can receive set-up and configuration commands from the unit controller 107. During exception processing the unit controller 107 can closely manage the operation of the memory controller 110. The memory controller 110 can receive data transfer parameters directly from the storage system interface 104 or from the unit controller 107 as a result of processing protocol messages received through the storage system interface 104. The memory controller 110 is also coupled to a system control random access memory (SCRAM) 112, such as a volatile memory, through a volatile memory bus 114.

The system control random access memory 112 is defined as a volatile memory structure for maintaining system control information. Contents 113 of the system control random access memory 112 include metadata, configuration information, and system pointers. The system control random access memory 112 can be managed by the unit controller 107 through the memory controller 110.

It is understood that while the storage system interface 104, unit controller 107, memory controller 110, and the system control random access memory 112 are shown as separate functions any combination of them can be provided in a single integrated circuit. It is further understood that the bus structures shown are an example only and additional interconnects between the functions is possible.

The memory controller 110 is also coupled to a non-volatile memory array 116 through a primary storage bus 118. The non-volatile memory array 116 is defined as an array of multi-level cell (MLC) NAND flash devices. It is understood that the array of the multi-level cell (MLC) NAND flash devices can be contained in a single package or multiple packages due to the total intended capacity of the data storage system 100 and the technology node of the non-volatile memory array 116. Multi-level cell (MLC) NAND flash has the characteristic of having two distinct, although paired, page types within an erase block. Depending on the specific device, these pages may alternate every other page or every other two or more pages. The fast or least-significant bit (LSB) pages have a characteristic of requiring four to five times less time to program than their sibling slow or most-significant bit (MSB) pages. It is also the characteristic of MLC NAND flash that the total amount of power required to program the slow pages, because of the longer programming time, is greater than the power required for programming the fast (LSB) pages.

A power monitor module 120 can be coupled to all of the devices of the data storage system 100. For clarity and ease of explanation these connections are not shown. The power monitor module 120 can be coupled to the host power interface 106 for receiving host power 122. The power monitor module 120 can store a reserve portion of the host power 122 provided by the host power interface 106, which is called "hold-up power". The hold-up power can be stored in a capacitor structure (not shown), or some other power storage mechanism, for use in support of power failure exception processing by the unit controller 107. The power monitor module 120 can include a voltage detection circuit, a power storage circuit, an interrupt communication circuit, a power multiplexer, or a combination thereof.

It is understood that the power monitor module 120 can provide the hold-up power to all of the components of the data storage system 100 for a limited time. The power monitor module 120, upon detecting the loss of the host power 122, can interrupt the unit controller 107, switch the power multiplexer from the host power 122 to the power storage circuit providing the hold-up power, and shut down non-essential functions. The rate of consumption of the hold-up power can be minimized in order to maintain useable power levels to the unit controller 107, memory, controller 110, system control random access memory 112, and the non-volatile memory array 116 for as long as possible.

The host interface 105 can provide in-flight data 124 for processing by the unit controller 107 or the memory controller 110. The in-flight data 124 can include protocol messages, host data, or a combination thereof In a situation where in-flight data has arrived at the storage system interface 104 but has not yet been processed to the non-volatile memory array 116, the power exception can be detected by the power monitor module 120. The power exception indicates that the host power 122 has been lost and the hold-up power has been invoked.

NAND flash has a requirement to program pages in an erase block sequentially and in an MLC NAND flash there is an equal number of fast and slow pages. It has been discovered that it is advantageous to use only the fast pages while skipping the associated slow pages, sequentially ordered in the erase block, when writing data in response to the power exception. The writing of the fast pages in order, while skipping the slow pages, satisfies the requirement for sequential pages written in the NAND flash but can avoid the lengthy writing of the slow pages. Writing to fast pages exclusively reduces the amount of time by as much as 40% while also reducing the amount of the hold-up power required after the power exception is detected.

It has also been discovered that fast pages can have lower bit-error rates and better reliability than slow pages. The writing of the slow pages actually creates a composite of both the slow page and the fast page, which can reduce the voltage differential between bits. Writing only the fast pages provides a lower bit error rate per page allowing a higher percentage of the page to be committed to data content as opposed to error correction codes. As a consequence, a power-down sequence that uses exclusively fast pages mitigates the risk associated with the writing of the in-flight data 124 and contents 113 of the system control random access memory 112.

The unit controller 107 must store any of the not yet processed in-flight data 124 and the contents 113 of the system control random access memory 112 prior to depleting the hold-up power. In an effort to reduce the data write time of the in-flight data 124 and the contents 113 of the system control random access memory 112, the unit controller 107 can write to each of the sequential fast pages within a predetermined erase block within the non-volatile memory array 116 without using the slow pages.

It has been discovered that the reduction in time required for storing the in-flight data 124 and the content 113 of the system control random access memory 112 can allow a simplification of the power monitor module 120. The power monitor module 120 can be reduced to utilize fewer capacitors in the power storage circuit, thereby reducing cost and increasing reliability.

Figure 2:
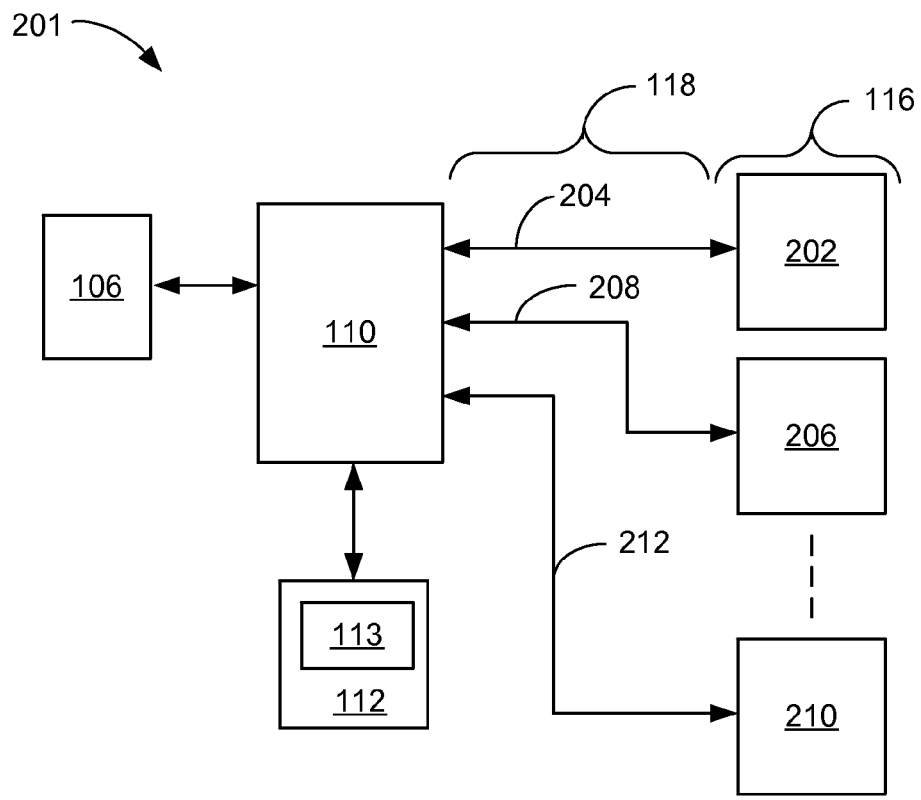
FIG. 2 is a hardware block diagram of the memory control structure of the data storage system of FIG. 1.

Referring now to FIG. 2, therein is shown a hardware block diagram of the memory control structure 201 of the data storage system 100 of FIG. 1. The hardware block diagram of the memory control structure 201 depicts the memory controller 110 coupled to a first non-volatile memory segment 202 coupled through a first storage channel 204, a second non-volatile memory segment 206 coupled through a second storage channel 208, and an Nth non-volatile memory segment 210 coupled through an Nth storage channel 212. The first storage channel 204, the second storage channel 208, and the Nth storage channel 212 comprise the primary storage bus 118.

The first non-volatile memory segment 202, the second non-volatile memory segment 206, and the Nth non-volatile memory segment 210 comprise the non-volatile memory array 116. The first non-volatile memory segment 202, the second non-volatile memory segment 206, and the Nth non-volatile memory segment 210 are each defined to be a multi-level cell NAND flash device. During the power exception handling, the unit processor can instruct the memory controller 110 to move the contents 113 of the system control random access memory 112 through the Nth storage channel 212 to the Nth non-volatile memory segment 210, such as a predetermined erase block structure can be reserved to store the pages of the contents 113 while the first storage channel 204 and the second storage channel 206 are involved with other operations.

It has been discovered that the direct writing of the contents 113 of the system control random access memory 112 through the Nth storage channel 212 to the Nth non-volatile memory segment 210 can independently commence without waiting for the completion of the first storage channel 204 or the second storage channel 208. The independent writing of the Nth non-volatile memory segment 210 allows the write operations to operate concurrently thereby shortening the time required to perform the power exception processing. The Nth non-volatile memory segment 210 can be pre-written, in preparation for the power exception process, with pointer information that will allow the identification and use of the stored pages to restore the contents 113 of the system control random access memory 112 on a subsequent power-on cycle. This can further shorten the duration of the power exception processing by the unit controller 107.

It is understood that the number of the storage channels is not limited to the number shown in the FIG. 2. The number of the storage channels in the implementation can match the number of the non-volatile memory segments.

Figure 3:
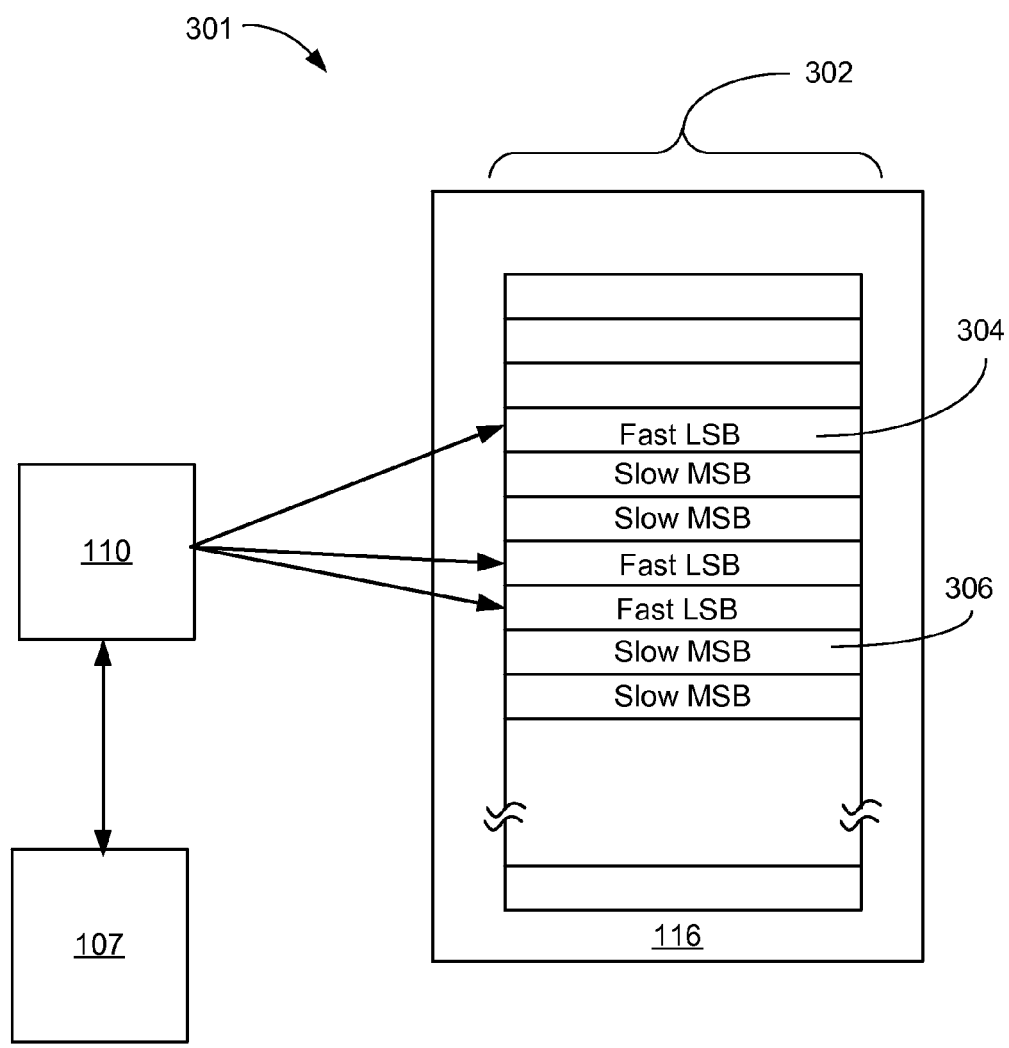
FIG. 3 is a block diagram of the erase block structures for writing during a power exception process.

Referring now to FIG. 3, therein is shown a block diagram of the erase block structures 301 for writing during a power exception process. The block diagram of the erase block structures 301 depicts an erase block 302 of the non-volatile memory array 116. The erase block 302 of the multi-level cell (MLC) NAND flash has two distinct, although paired, page types within the erase block 302. Depending on the specific device, these pages may alternate every other page or every other two or more pages. The fast pages 304, such as the least-significant bit (LSB) pages, require only 20-25% of the time to program as compared to slow pages 306 such as most-significant bit (MSB) pages.

The non-volatile memory array 116 comprising MLC NAND flash requires the pages in the erase block 302 be programmed sequentially. It is therefore advantageous for the memory controller 110 to address only the fast pages, sequentially ordered in the erase block 302, when writing data due to the power exception. Writing to fast pages exclusively reduces the amount of time and power required after the power exception processing by the unit controller 107.

Figure 4:
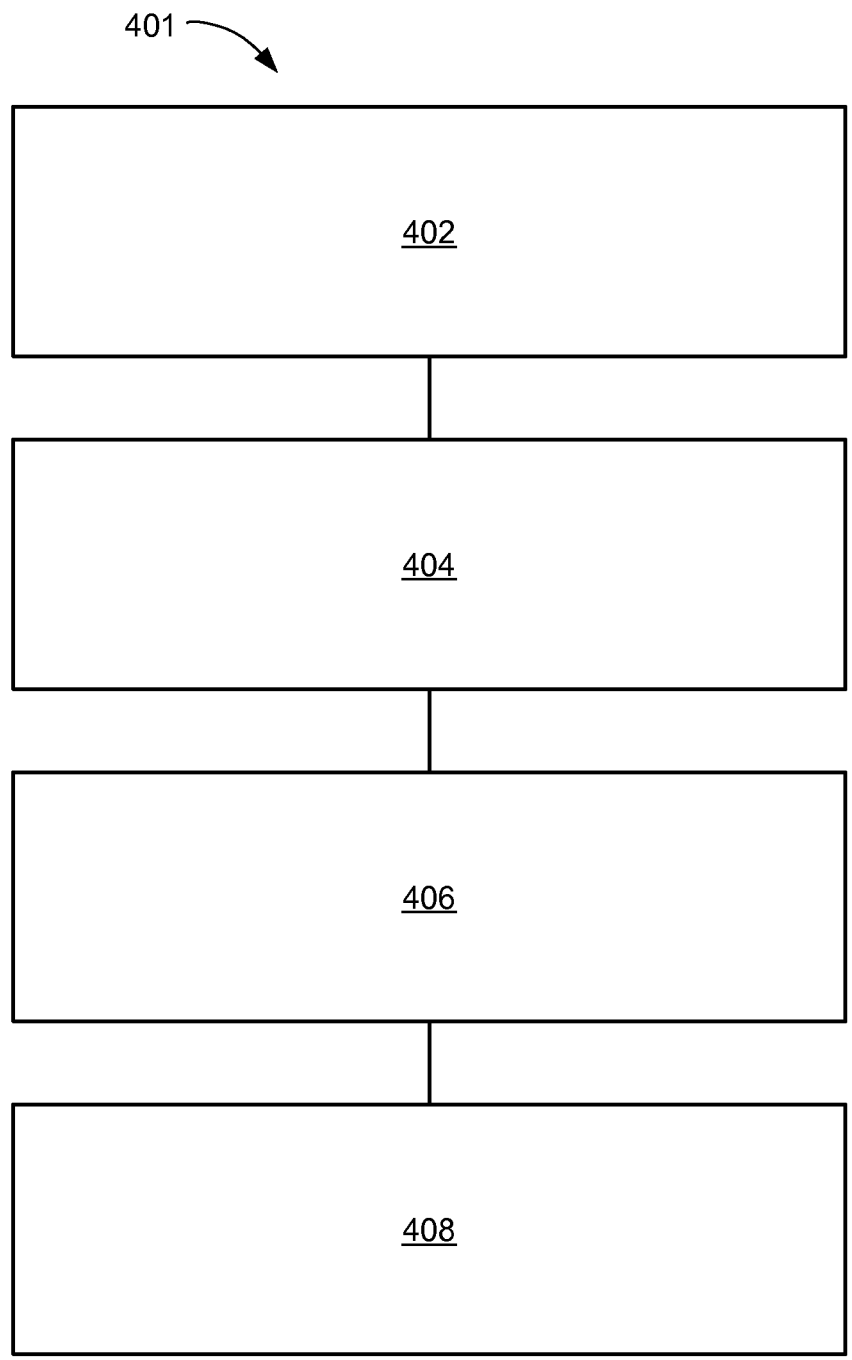
FIG. 4 is a flow chart of a power loss interrupt processing by the unit controller of FIG. 1.

Referring now to FIG. 4, therein is shown a flow chart of a power loss interrupt processing 401 by the unit controller 107 of FIG. 1. The flow chart of the power loss interrupt processing 401 depicts a memory controller set-up block 402, in which the unit controller 107 can define a write operation within the memory controller 110 of FIG. 1. The memory controller set-up block 402 can consume as much as 500 micro-seconds, of the available time of the hold-up power, in set-up of the state information for writing the power down data. The flow then proceeds to a write first channel block 404, in which the memory controller 110 can initiate a transfer of the LSB pages of the in-flight data 124, through the first storage channel 204 of FIG. 2, to the fast pages 304 of FIG. 3. The complete transfer of the in-flight data 124 can take 900 micro-seconds of the available time of the hold-up power.

The flow proceeds to a write second channel block 406, in which the memory controller 110 can overlap the write of the MSB pages of the in-flight data 124 to only the fast pager 304. This operation is overlapping the write of the LSB pages but can complete in 900 micro-seconds of the available time of the hold-up power instead of 2600 micro-seconds required to write the MSB pages of the in-flight data 124 to the slow pages 306 of FIG. 3. The writing to exclusively the fast pages 304 can save 1700 micro-seconds of the available time of the hold-up power, which can represent up to a 40% saving in the time required to save the in-flight data 124.

The flow can proceed to a store SCRAM block 408 without waiting for the completion of the writes of the in-flight data 124 by writing the contents 113 of the system control random access memory 112 of FIG. 1 through the Nth storage channel 212 of FIG. 2 to a pre-determined erase block such as the Nth non-volatile memory segment 210. The time required to write the contents 113 of the system control random access memory 112 is shortened by having the associated system pointers, to the data, pre-written in anticipation of the power-off cycle.

Thus, it has been discovered that the data storage system and device or product of the present invention furnishes important and heretofore unknown and unavailable solutions, capabilities, and functional aspects for reliably storing all the interface data received by the data storage system 100 prior to or during a loss of the host power 122.

Figure 5:
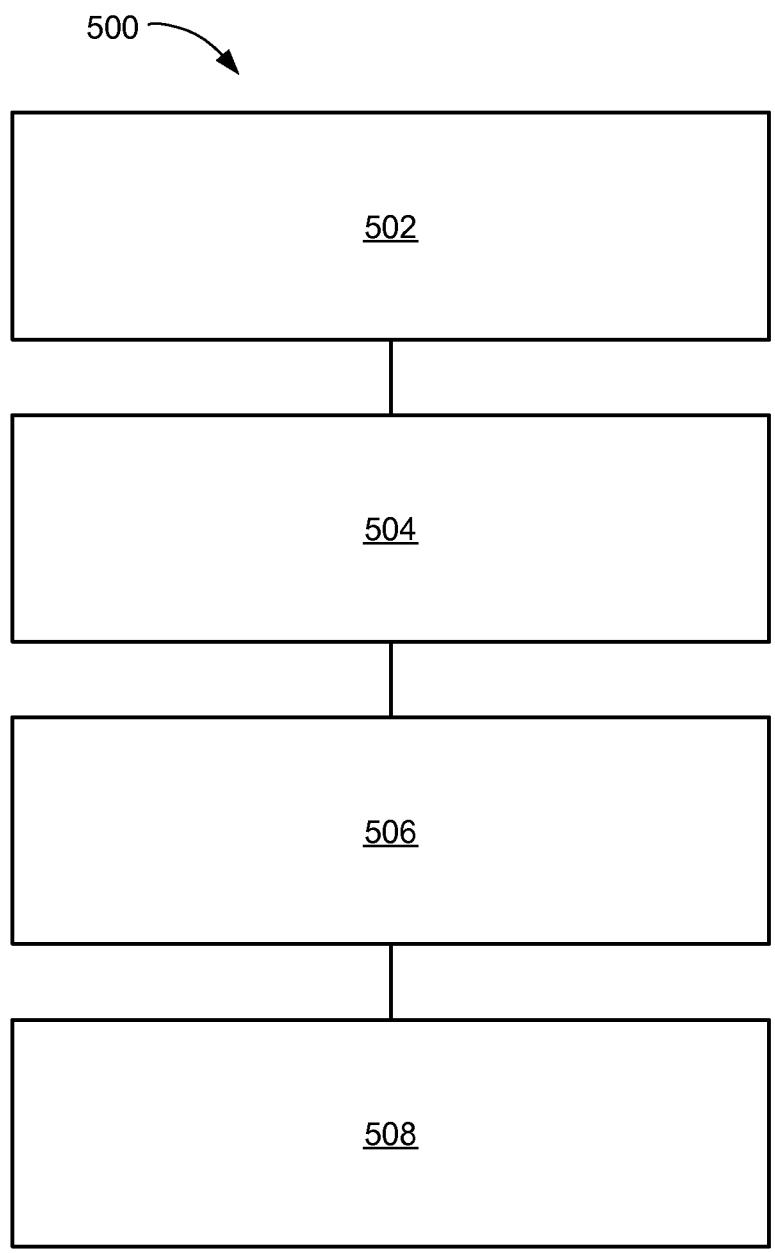
FIG. 5 is a flow chart of a method of operation of a data storage system in a further embodiment of the present invention.

Referring now to FIG. 5, therein is shown a flow chart of a method 500 of operation of the data storage system 100 in a further embodiment of the present invention. The method 500 includes: providing a power monitor module for detecting a loss of host power in a block 502; interrupting a unit controller by the power monitor module in a block 504; configuring a memory controller by the unit controller in a block 506; and writing a non-volatile memory array for storing in-flight data and contents of a system control random access memory in a multi-level cell NAND flash device in response to detecting the loss of the host power in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A data storage system comprising:
   a power monitor module for detecting a loss of a host power;
   a unit controller coupled to the power monitor module for responding to the loss of the host power detected;
   a memory controller coupled to the unit controller; and
   a non-volatile memory array coupled to the memory controller for storing the in-flight data and contents of a system control random access memory includes writing only fast pages of a multi-level cell NAND flash device.

2. The system as claimed in claim 1 further comprising a volatile memory bus between the memory controller and the system control random access memory.

3. The system as claimed in claim 1 wherein the non-volatile memory array includes a first non-volatile memory segment, a second non-volatile memory segment, and an Nth non-volatile memory segment.

4. The system as claimed in claim 1 further comprising an erase block pre-assigned for storing the contents of a system control random access memory.

5. The system as claimed in claim 1 further comprising a primary storage bus between the memory controller and the non-volatile memory array.

6. The system as claimed in claim 1 further comprising:
   a storage system interface coupled to the power monitor module for receiving the host power and the in-flight data; and
   slow pages in a first Nth non-volatile memory segment and the Nth non-volatile memory segment skipped by the memory controller.

7. The system as claimed in claim 6 further comprising a volatile memory bus between the memory controller and the system control random access memory includes the contents of the system control random access memory coupled through the memory controller to the Nth non-volatile memory segment.

8. The system as claimed in claim 6 wherein the non-volatile memory array includes a first storage channel coupled to the first non-volatile memory segment, a second storage channel coupled to the second non-volatile memory segment, and an Nth storage channel coupled to the Nth non-volatile memory segment.

9. The system as claimed in claim 6 further comprising an erase block pre-assigned for storing the contents of a system control random access memory includes system pointers pre-written to the erase block for a subsequent restoration of the host power.

10. The system as claimed in claim 6 further comprising a primary storage bus between the memory controller and the non-volatile memory array and the memory controller having a first storage channel for the in-flight data and an Nth storage channel for the contents of a system control random access memory for concurrently transferring the in-flight data and the content of the system control random access memory.

11. A method of operation of a data storage system comprising:
   providing a power monitor module for detecting a loss of host power;
   interrupting a unit controller by the power monitor module;
   configuring a memory controller by the unit controller; and
   writing a non-volatile memory array for storing in-flight data and contents of a system control random access memory in a multi-level cell NAND flash device in response to detecting the loss of the host power.

12. The method as claimed in claim 11 wherein writing the non-volatile memory array includes writing only fast pages of the multi-level cell NAND flash device.

13. The method as claimed in claim 11 further comprising writing a first non-volatile memory segment, a second non-volatile memory segment, and an Nth non-volatile memory segment forming the non-volatile memory array.

14. The method as claimed in claim 11 further comprising pre-assigning an erase block for writing the contents of the system control random access memory.

15. The method as claimed in claim 11 wherein configuring the memory controller by the unit controller includes selecting a first storage channel for the in-flight data and an Nth storage channel for the contents of a system control random access memory.

16. A method of operation of a data storage system comprising:
   providing a power monitor module for detecting a loss of host power through a storage system interface;
   interrupting a unit controller by the power monitor module including activating a hold-up power in the power monitor module;
   configuring a memory controller by the unit controller including communicating through a storage bus; and
   writing a non-volatile memory array for storing in-flight data and the contents of the system control random access memory in response to detecting the loss of the host power including writing only fast pages of a multi-level cell NAND flash device through an Nth storage channel.

17. The method as claimed in claim 16 wherein writing only the fast pages of the multi-level cell NAND flash device includes writing the in-flight data to a first non-volatile memory segment while concurrently writing the contents of the system control random access memory to an Nth non-volatile memory segment.

18. The method as claimed in claim 16 further comprising writing a first non-volatile memory segment, a second non-volatile memory segment, and an Nth non-volatile memory segment forming the non-volatile memory array including activating a first storage channel, a second storage channel, and an Nth storage channel.

19. The method as claimed in claim 16 further comprising pre-assigning an erase block for writing the contents of the system control random access memory including writing system pointers to the erase block for a subsequent restoration of the host power.

20. The method as claimed in claim 16 wherein configuring the memory controller by the unit controller includes selecting a first storage channel for the in-flight data and an Nth storage channel for the contents of a system control random access memory for concurrent transferring the in-flight data and the content of the system control random access memory.

* * * * *

UNITED STATES PATENT AND TRADEMARK OFFICE
CERTIFICATE OF CORRECTION

PATENT NO. : 8,792,273 B2
APPLICATION NO. : 13/493912
DATED : July 29, 2014
INVENTOR(S) : Ellis et al.

Page 1 of 4

It is certified that error appears in the above-identified patent and that said Letters Patent is hereby corrected as shown below:

In the Claims

Please delete existing "claims 1 through 20" in their entirety and insert --claims 1 through 20-- as indicated below:

--1. A data storage system comprising:

a power monitor module for detecting a loss of a host power;

a unit controller coupled to the power monitor module for responding to the detected loss of the host power;

a memory controller coupled to the unit controller;

a plurality of multi-level cell NAND flash devices; and a non-volatile memory array coupled to the memory controller for storing in-flight data and contents of a system control random access memory by writing the in-flight data and contents of the system control random access memory only to fast pages of one or more of the plurality of multi-level cell NAND flash devices.

2. The system as claimed in claim 1 further comprising a volatile memory bus between the memory controller and the system control random access memory.

3. The system as claimed in claim 1 wherein the non-volatile memory array includes a first non-volatile memory segment, a second non-volatile memory segment, and an Nth non-volatile memory segment.

Signed and Sealed this
Twenty-third Day of December, 2014

Michelle K. Lee
*Deputy Director of the United States Patent and Trademark Office*

4. The system as claimed in claim 1 further comprising an erase block pre-assigned for storing the contents of the system control random access memory.

5. The system as claimed in claim 1 further comprising a primary storage bus between the memory controller and the non-volatile memory array.

6. The system as claimed in claim 3, further comprising:

a storage system interface coupled to the power monitor module for receiving the host power and the in-flight data;

wherein the Nth non-volatile memory segment includes slow pages skipped by the memory controller when writing the in-flight data and contents of the system control random access memory.

7. The system as claimed in claim 3, further comprising a volatile memory bus between the memory controller and the system control random access memory, wherein the contents of the system control random access memory are coupled through the volatile memory bus and memory controller to the Nth non-volatile memory segment.

8. The system as claimed in claim 3, wherein the non-volatile memory array includes a first storage channel coupled to the first non-volatile memory segment, a second storage channel coupled to the second non-volatile memory segment, and an Nth storage channel coupled to the Nth non-volatile memory segment.

9. The system as claimed in claim 6 further comprising an erase block pre-assigned for storing the contents of the system control random access memory and pre-written system pointers to the erase block for a subsequent restoration of the host power.

10. The system as claimed in claim 6 further comprising a primary storage bus between the memory controller and the non-volatile memory array, a first storage channel for the in-flight data, and an Nth storage channel for the contents of a system control random access memory, wherein the memory controller is configured to concurrently transfer the in-flight data using the first storage channel and the content of the system control random access memory using the Nth storage channel.

11. A method of operation in a data storage system comprising:

at a power monitor module of the data storage system, detecting a loss of host power;

after the power monitor module detects the power loss of host power, interrupting a unit controller of the data storage system;

after the unit controller has been interrupted, sending one or more commands from the unit controller to a memory controller to manage operation of the memory controller; and in response to detecting the loss of host power, storing in-flight data and contents of a system control random access memory in one or more multi-level cell NAND flash devices of a non-volatile memory array.

12. The method as claimed in claim 11 wherein storing in-flight data and contents of the system control random access memory includes writing the in-flight data and contents of the system control random access memory only to fast pages of the one or more multi-level cell NAND flash devices.

13. The method as claimed in claim 11 further comprising writing a first non-volatile memory segment, a second non-volatile memory segment, and an Nth non-volatile memory segment in the non-volatile memory array.

14. The method as claimed in claim 11 further comprising pre-assigning an erase block for writing the contents of the system control random access memory.

15. The method as claimed in claim 11 wherein the memory controller, in response to the one or more commands from the unit controller, uses a first storage channel for storing the in-flight data and an Nth storage channel for storing the contents of the system control random access memory.

16. A method of operation in a data storage system comprising:

at a power monitor module of the data storage system, detecting a loss of host power through a storage system interface;

after the power monitor module detects the power loss of host power, interrupting a unit controller of the data storage system and providing hold-up power to the data storage system from a power storage mechanism of the data storage system;

after the unit controller has been interrupted, sending one or more commands from the unit controller through a storage bus to a memory controller to manage operation of the memory controller; and in response to detecting the loss of the host power, storing in-flight data and contents of a system control random access memory in one or more multi-level cell NAND flash devices of a non-volatile memory array, including writing only fast pages of a respective multi-level cell NAND flash device coupled to an Nth storage channel of the data storage system.

17. The method as claimed in claim 16, including writing the in-flight data to a first non-volatile memory segment of the non-volatile memory array while concurrently writing the contents of the system control random access memory to an Nth non-volatile memory segment of the non-volatile memory array.

18. The method as claimed in claim 16, including writing data to a first non-volatile memory segment, a second non-volatile memory segment, and an Nth non-volatile memory segment of the non-volatile memory array, including activating a first storage channel, a second storage channel, and an Nth storage channel of the data storage system.

19. The method as claimed in claim 16 further comprising pre-assigning an erase block for writing the contents of the system control random access memory and writing system pointers to the erase block for a subsequent restoration of the host power.

20. The method as claimed in claim 16, wherein the memory controller concurrently transfers the in-flight data and the contents of the system control random access memory using a first storage channel for storing the in-flight data and an Nth storage channel for storing the contents of the system control random access memory.--